United States Patent
Happel

(10) Patent No.: US 7,084,545 B2
(45) Date of Patent: Aug. 1, 2006

(54) ELECTRIC MACHINE AND METHOD OF MAKING AN ELECTRIC MACHINE

(75) Inventor: Klaus Happel, Wollbach (DE)

(73) Assignee: Siemens Aktiengesellschaft, München (DE)

( * ) Notice: Subject to any disclaimer, the term of this patent is extended or adjusted under 35 U.S.C. 154(b) by 41 days.

(21) Appl. No.: 10/738,623

(22) Filed: Dec. 17, 2003

(65) Prior Publication Data

US 2004/0155552 A1    Aug. 12, 2004

(30) Foreign Application Priority Data

Dec. 17, 2002   (DE)   .............................. 102 59 090

(51) Int. Cl.
  *H02K 1/18*    (2006.01)
  *H02K 1/28*    (2006.01)
(52) U.S. Cl. ...................................... 310/218; 310/216
(58) Field of Classification Search ........ 310/216–217, 310/218, 254
See application file for complete search history.

(56) References Cited

U.S. PATENT DOCUMENTS

| | | | | |
|---|---|---|---|---|
| 4,979,285 A | * | 12/1990 | Martin | ........................ 29/598 |
| 5,089,730 A | | 2/1992 | O'Connor et al. | |
| 6,081,059 A | * | 6/2000 | Hsu | ............................ 310/179 |
| 6,288,471 B1 | * | 9/2001 | Kometani et al. | ........... 310/254 |

FOREIGN PATENT DOCUMENTS

| | | |
|---|---|---|
| DE | 196 09 340 A1 | 9/1997 |
| WO | WO 00/28639 | 5/2000 |
| WO | WO01/95459 A1 | 12/2001 |

\* cited by examiner

*Primary Examiner*—Tran Nguyen
(74) *Attorney, Agent, or Firm*—Henry M. Feiereisen

(57) ABSTRACT

An electric machine includes an external rotor rotatable about a rotation axis, and a stator arranged in coaxial relationship to the rotation axis in the external rotor. The stator is comprised of a first stator portion to define a core element, and a second stator portion arranged in the form of a ring in surrounding relationship to the core element and including radially inwardly directed teeth to define a comb-shaped configuration with slots which taper towards the rotation axis for receiving a stator winding. The comb teeth have free ends which are supported on the core element.

11 Claims, 1 Drawing Sheet

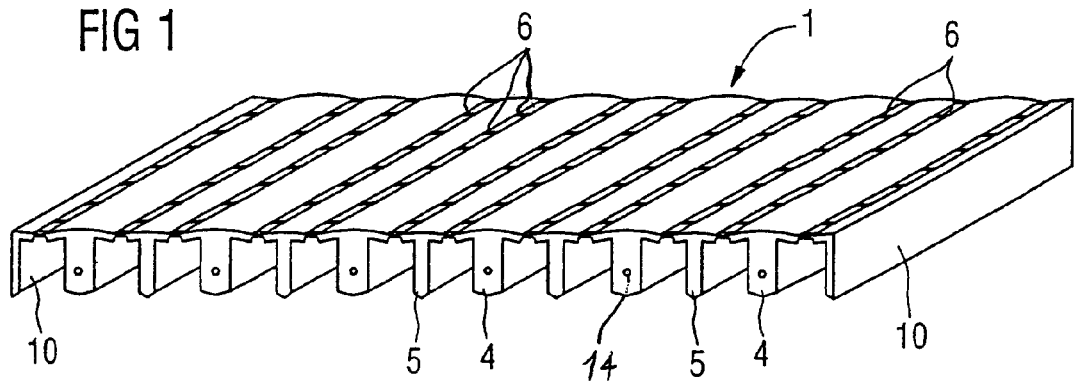
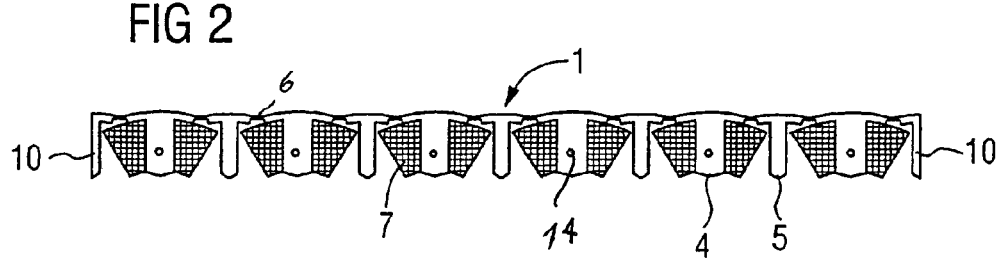
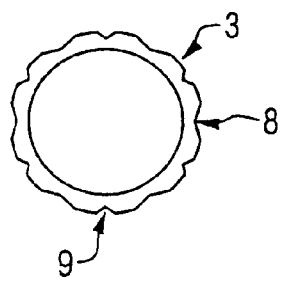
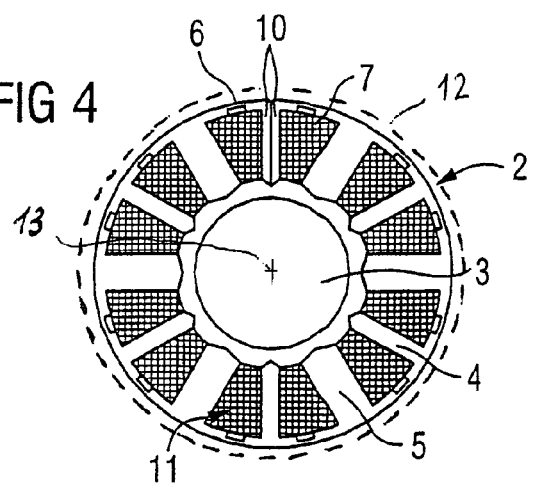

ELECTRIC MACHINE AND METHOD OF MAKING AN ELECTRIC MACHINE

CROSS-REFERENCES TO RELATED APPLICATIONS

This application claims the priority of German Patent Application, Serial No. 102 59 090.7, filed Dec. 17, 2002, pursuant to 35 U.S.C. 119(a)–(d), the disclosure of which is incorporated herein by reference.

BACKGROUND OF THE INVENTION

The present invention relates, in general, to an electric machine, and to a method of making such an electric machine.

External rotor motors are generally known to have an external rotor which is rotatable about a rotation axis. Disposed in coaxial relationship to the rotation axis inside the external rotor is a stator having slots for receiving the stator winding, whereby the slots taper in a direction to the rotation axis. The stator is formed about its outer circumference with small openings in the slots for wrapping the winding to the stator. In the event, it is desired to fill the slot with winding as much as possible, the winding operation become cumbersome because the stator winding must be wound through the narrow openings.

The coils of the stator winding may hereby be mounted by means of needle winding technique, flyer technique, draw-in technique, or manual guiding-in technique, into the slots. Using a needle arrangement to wind a copper coil results only in a limited slot filling degree so that the power density in the motor is decreased. The draw-in technique requires a prolongation of the winding end portion so that the coil exhibits a higher electrical resistance, accompanied by greater losses in the motor. The manual guiding-in technique is labor-intensive and thus expensive.

In particular when exciter coil windings are involved, the broad tooth tips of the slots require a flexible copper coil. Thus, the winding quality becomes substandard, when the winding operation is carried out automatically.

It would therefore be desirable and advantageous to provide an improved electric machine and method of making an electric machine to obviate prior art shortcomings.

SUMMARY OF THE INVENTION

According to one aspect of the present invention, an electric machine includes an external rotor rotatable about a rotation axis, and a stator arranged in coaxial relationship to the rotation axis in the external rotor, wherein the stator includes a first stator portion to define a core element, and a second stator portion arranged in surrounding relationship to the core element in the form of a ring and including radially inwardly directed teeth to define a comb-like configuration with slots which taper towards the rotation axis for receiving a stator winding, wherein the comb teeth have free ends supported on the core element.

The present invention resolves prior art problems by making the stator stack of two stator portions, namely a stator core and a comb-shaped stator element. In this way, the stator winding can be mounted to the stator in a simple and cost-efficient manner. Suitable, the comb-shaped stator element can be laid or bent around the stator core.

According to another feature of the present invention, adjacent ends of the annularly shaped comb-like stator element are securely fixed to one another.

According to another feature of the present invention, the first stator portion can be constructed as a laminated core shaped in the form of a cylindrical shaft, and the second stator portion can be constructed as a stack of laminations, with the teeth being disposed equidistantly and constructed for attachment of the stator winding, before assembly of the stator. Manufacture of comb-like laminations is generally inexpensive. Suitably, connectors can be provided for securing the individual stacks of laminations of the second stator portion with one another. An example of a suitable connector includes registration members for aligning and securing the laminations.

According to another feature of the present invention, the teeth of the comb-shaped stator element may be so supported on the core element as to provide a magnetic yoke therebetween forming a closed magnetic loop.

The stability of the stator can be enhanced by configuring the free ends of the comb teeth in a pointed manner for placement in complementary grooves of the core element during assembly. Suitably, the pointed free ends of the comb teeth lock into the grooves.

According to another aspect of the present invention, a method of making an electric machine includes the steps of placing a stator winding in tapered slots between radially inwardly extending teeth of a comb-shaped stator portion, shaping the comb-shaped stator portion into a ring, placing the ring in surrounding relationship to a stator core such that free ends of the comb teeth are supported on the stator core to thereby form a stator; and positioning the stator in an external rotor in coaxial relationship to a rotation axis thereof.

According to still another aspect of the present invention, a method of making a stator of an electric machine, includes the steps of placing a stator winding in slots between radially inwardly extending teeth of a comb-shaped stator portion, and wrapping the comb-shaped stator portion about a stator core such that free ends of the comb teeth are supported on the stator core.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic front, top and side perspective view of one stator portion in the form of a stack of stator laminations in comb-shaped configuration in accordance with the present invention;

FIG. 2 is a schematic front view of the stator portion of FIG. 1 with attached stator winding;

FIG. 3 is a schematic illustration of a core element having notches about its circumference and constituting another stator portion; and FIG. 4 is a schematic illustration of a fully assembled stator according to the present invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic front, top and side perspective view of one stator potion according to the present invention, generally designated by reference numeral 1 and forming part of a stator, generally designated by reference numeral 2 and shown in more detail in FIG. 4. The stator 2 is the fixed component of an external rotor motor and is received inside an external rotor, indicated by broken line 12, in coaxial relationship to a rotation axis 13 about which the rotor 12 is rotatable. As is generally known, the stator 2 is hereby placed at a distance to the rotor 12 at formation of an air gap.

As shown in FIG. 1, the stator portion 1 is comprised of plural stacks of sheet metal laminations in parallel side-by-side relationship to define a comb-like configuration with comb teeth 4, 5 arranged at regular intervals, whereby the comb teeth 4 have a width which is greater than a width of the comb teeth 5. Connectors 6 in spaced-apart relationship secure adjacent stacks of laminations in circumferential direction at their upper ends, and registration members 14 in the form of dents or bumps in the metal sheets secure the stacks of laminations of the stator portion 1 to one another, as shown in FIG. 1, so as to realize the comb structure. Although registration members 6 are shown here to implement the connection of the stacks of laminations of the stator portion 1, it is, of course, possible to use other types of connections, such as, e.g., riveting, gluing, or welding. As shown in FIG. 1, the stator portion 1 is so configured that the wider comb teeth 4 alternate with the narrower comb teeth 5.

Referring now to FIG. 2, there is shown a schematic front view of the stator portion 1, with a coil 7 attached to each of the wider comb teeth 4 so that each comb tooth 4 is wrapped on both sides with a coil 7. The coils 7 have a V-shaped configuration which are tapered in the direction of the rotation axis 13. Although not shown in the drawing, the coils 7 are each wound on an insulating plastic body before being attached to the comb teeth 4, whereby the attachment of the coils 7 onto the comb teeth 4 may be carried out automatically by a suitable inserting machine. All coils 7 form together the stator winding of the stator 2.

As shown in FIG. 3, the stator 2 further includes another stator portion 3 in the form a cylindrical core element comprised of laminations. The core element 3 has an outer perimeter formed with notches 8, 9 to complement the configuration of the pointed teeth ends of the comb teeth 4, 5. In other words, the core element 3 has wider notches 8 and narrower notches 9 in alternating sequence.

FIG. 4 is a schematic illustration of the fully assembled stator 2 according to the present invention. The assembly of the stator 2 is as follows: The stator portion 1 of FIG. 1, after being provided with the stator winding, as described above, is shaped into a ring and wrapped around the laminated core 3. Depending on the configuration of the connectors 6, the stator portion 1 may also be bent into the ring shape. The adjacent ends 10 of the ring-shaped stator portion 1 abut hereby one another and are securely fixed to each other. The width of both ends 10 corresponds hereby to the width of the narrow comb tooth 5. In the assembled state, the radially inwardly directed comb teeth 4, 5 are supported on the laminated core 3, with the ends of the comb teeth 4, 5 engaging the complementary notches 8, 9. In other words, the wider comb teeth 5 engage the notches 8 and the narrower comb teeth 4 engage the notches 9. Although not shown in the drawing, the comb teeth 4, 5 may also be constructed in a way to lock in the respective notches 8, 9. In any event, the engagement of the comb teeth 4, 5 in the notches 8, 9 of the laminated core 3 results in a superior magnetic yoke.

In the assembled state of the stator 2, as shown in FIG. 4, the coils 7 and thus the stator winding almost completely fill the slots 11 formed between the comb teeth 4, 5 and tapered in the direction of the rotation axis 13.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An electric machine, comprising:
   an external rotor rotatable about a rotation axis; and
   a stator arranged in coaxial relationship to the rotation axis in the external rotor, said stator including a first stator portion to define a core element, and a second stator portion arranged in surrounding relationship to the core element in the form of a ring and including radially inwardly directed teeth to define a comb-shaped configuration with slots which taper towards the rotation axis for receiving a stator winding, said comb teeth having free ends supported on the core element, wherein the second stator portion is constructed as a stack of laminations, with each pair of adjacent teeth of the laminations being connected in circumferential direction of the ring by axially spaced-apart connectors.

2. The electric machine of claim 1, wherein the second stator portion is constructed so as to be placeable around the core element.

3. The electric machine of claim 1, wherein the second stator portion is constructed so as to be bendable around the core element.

4. The electric machine of claim 1, wherein adjacent ends of the annularly-shaped second stator portion are securely fixed to one another.

5. The electric machine of claim 1, wherein the first stator portion is constructed as a laminated core shaped in the form of a cylindrical shaft, and wherein the teeth are disposed equidistantly and constructed for attachment of the stator winding before assembly of the stator.

6. The electric machine of claim 1, further comprising registration members to secure the stack of laminations in axial direction.

7. The electric machine of claim 1, wherein the first and second stator portions are so constructed as to form a magnetic yoke between the teeth and the core element.

8. The electric machine of claim 1, wherein the free ends of the teeth are pointed for reception in complementary notches of the core element.

9. The electric machine of claim 8, wherein the pointed free ends of the teeth look into the notches.

10. The electric machine of claim 1, wherein the second stator portion includes a first plurality of said teeth of a width which is wider than a width of a second plurality of said teeth.

11. The electric machine of claim 10, wherein the first and second pluralities of teeth are arranged in alternating fashion.

* * * * *